United States Patent [19]

Apps

[11] 4,152,384
[45] May 1, 1979

[54] METHOD OF PRODUCING POROUS RUBBER SHEETING

[75] Inventor: Andrew J. Apps, Derby, England

[73] Assignee: 4D Research and Development Company Limited, Derby, England

[21] Appl. No.: 808,117

[22] Filed: Jun. 20, 1977

[30] Foreign Application Priority Data

Jun. 23, 1976 [GB] United Kingdom ............... 26118/76

[51] Int. Cl.² .................. B29H 3/06; B29H 9/00; B29C 17/04; B29B 27/00
[52] U.S. Cl. ..................................... 264/41; 264/145; 264/154; 264/156; 264/DIG. 6; 264/DIG. 47; 264/DIG. 53
[58] Field of Search ................. 264/41, 145, 154, 156, 264/291, 292, 288, DIG. 6, DIG. 7, DIG. 8, DIG. 47, DIG.53; 260/2.5 AY, 2.5 AK

[56] References Cited

U.S. PATENT DOCUMENTS

| | | | |
|---|---|---|---|
| 2,949,639 | 8/1960 | Woodward | 264/288 |
| 3,046,172 | 7/1962 | Reid | 264/DIG. 6 |
| 3,243,845 | 4/1966 | Cassel | 264/288 |
| 3,302,501 | 2/1967 | Greene | 264/DIG. 47 |
| 3,340,235 | 9/1967 | Holt | 264/175 |
| 3,682,760 | 8/1972 | Fairbanks | 264/289 |
| 3,775,521 | 11/1973 | Yamamoto et al. | 264/289 |
| 3,903,234 | 9/1975 | Ikeda et al. | 264/289 |
| 3,963,813 | 6/1976 | Keith | 264/292 |

*Primary Examiner*—James B. Lowe
*Attorney, Agent, or Firm*—William R. Liberman

[57] ABSTRACT

This invention provides a method for producing porous elastomeric sheet material, wherein ungelled elastomer liquid material is admixed with hollow spherical filler particles and then spread to form a sheet, which is then dried and gelled. The dried and gelled sheet of filled elastomer is subjected to rigorous biaxial stretching, wherein the elastomeric material surrounding at least some of the particles is stretched and ultimately broken by the rigorous stretching, to form a porous sheet material.

7 Claims, 2 Drawing Figures

METHOD OF PRODUCING POROUS RUBBER SHEETING

A method of producing porous articles of elastomeric material, particularly porous latex rubber sheeting, in which a plurality of hollow spherical filler members of hard inert material are incorporated in a mix of elastomeric material which is spread to form a sheet and is allowed to gel and dry after which the dried sheet is subjected to rigorous multiple stretching thereby to produce a sheet with permanent porosity.

The mix may be of natural latex or of a synthetic latex such as polychloroprene or acrylonitrile-butadiene co-polymer.

DESCRIPTION OF A PREFERRED EMBODIMENT

Figure 1:
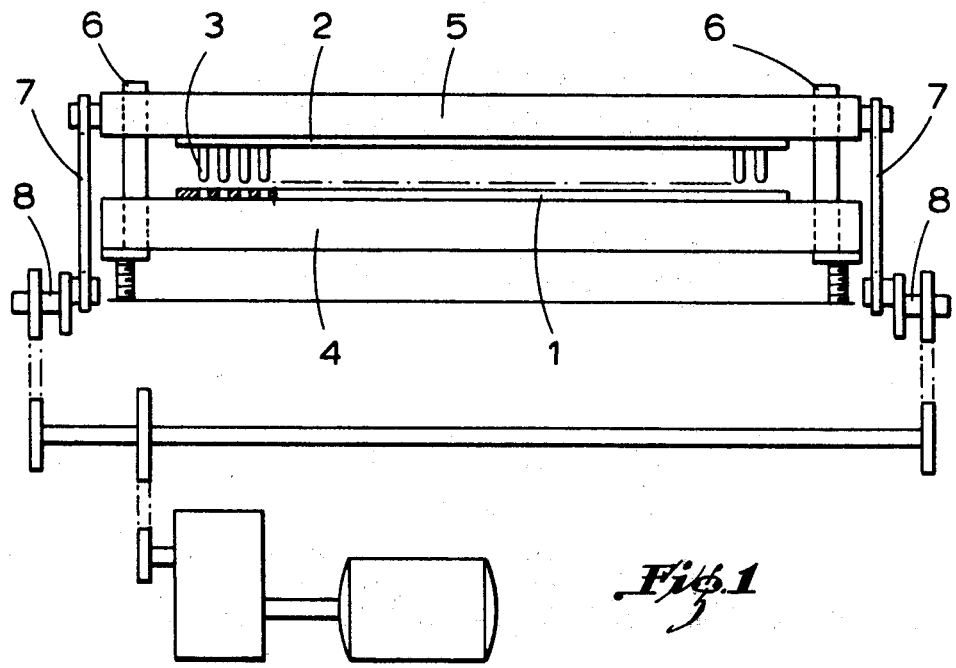
FIG. 1 of the drawings is a schematic side elevation view of a stretching machine for use in carrying out the method of the present invention.
Figure 2:
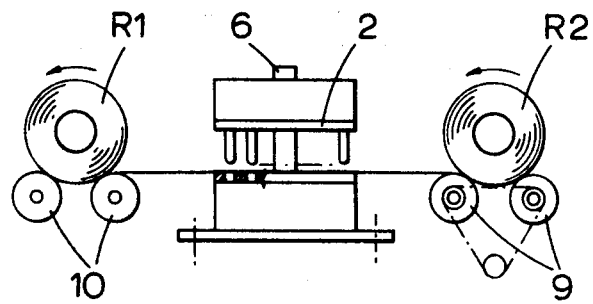
FIG. 2 is a front schematic elevation view of the stretching machine.

A dispersion consisting of 35% (by weight) of hollow spherical filler products in water is first prepared. The filler particles are preferably hollow spheres of the order of 50 microns or less in size. Such filler particles are known and are, for example, supplied under the name "Fillite 300/7" by a firm called Fillite (Runcorn) Limited. The composition of a suitable dispersion is as follows:

| | |
|---|---|
| Fillite 300/7 | 35.00 |
| Dispersol (a sodium salt of a disulphonic acid) | 0.35 |
| 20% Potassium Oleate | 0.85 |
| Reversol DH461 (Polyacrylate thickner of Revertex Ltd) | 1.60 |
| Water | 62.20 |
| | 100.00 |

The dispersion is incorporated in a latex rubber mix. This latex mist may have the following composition:

| | |
|---|---|
| Prevulcanised natural latex (MR Revultex of Revertex Ltd) | 167.00 |
| 50% Zinc Oxide dispersion | 2.00 |
| 50% Sulphur dispersion | 0.20 |
| 50% Zinc diethyldithiocarbamate dispersion | 0.20 |
| 35% Fillite dispersion | 100.00 |
| 25% Polysiloxane heat-gel sensitiser (Coagulant WS of Bayer U.K. Ltd) | 6.00 |
| Black pigment dispersion (Irgalite Black CP V1 Paste of Ciba-Geigy | 5.00 |

After the dispersion has been incorporated in the latex mix, the mixture is spread to sheet form and caused to gel by the application of heat and dried. The dried sheet will then be filled with minute cavities each defined by one of the hollow filler particles, the particles being bound by adhesion to the rubber. These cavities will normally be very close together, the closeness of the cavities depending on the portion of filler particles incorporated into the mix.

The dried sheet is then subjected to rigorous stretching. Such stretching elongates the cavities and causes the rubber to break away from the outside of the filler spheres. The thin membranes extending between the multiplicity of elongated cavities rupture under the strain thereby to produce a sheet of permanent porosity.

The sheet is conveniently stretched by a machine as illustrated in the drawing.

The machine comprises a lower plate 1 perforated by holes of about 0.65" diameter. These holes are uniformly spaced in and extend over an area of 210 square inches. The holes are as close together as is practical. An upper plate 2 is located above in plate 1 and carries pins 3 about 1¼" long × ½" diameter. The pins have spherical ends and the pin centres match the centres of the holes in plate 1 so that they can be entered in the holes. The plates 1 and 2 are mounted on beams 4 and 5 respectively. The beams are located by guide pins 6. The beam 5 is attached to connecting rods 7 and thence to crank shafts 8 which allow vertical movement of about 1". The crankshafts are driven by a geared electric motor. The bottom beam 4 which carries the plate 1 is adjustable up and down so that the amount of penetration of the pins 3 into the holes can be varied.

Rubber sheeting is drawn through the machine and between the plates 1, 2 from a roll R1 by rotation of two driven rollers 9 on which is a roll R2 of processed rubber. The roll R1 of rubber to be processed rests on rollers 10. The rollers 10 are not driven and are slightly braked to create a small tension.

When the upper plate 2 descends, the pins 3 press on the sheeting and stretch it over the pins and into the holes in the lower plate 1. The degree of stretch depends on the amount by which the pins 3 are allowed to penetrate the holes.

Conveniently, the sheeting is advanced between the plates at a rate of 3 feet per minute and the sheeting is pressed into the holes by the pins 180 times per minute.

As an alternative to stretching the sheeting as hereinbefore described it is possible to produce the desired porosity by the application of pressure to sheeting stretched over a frame and supported on a mesh structure. Such pressure may be liquid pressure, positive air pressure or, more conveniently, negative air pressure, i.e. suction.

The stretching operation will cause some of the hollow filler spheres to be visibly removed from the sheet. The hollow filler spheres nearest the surface of the sheets will obviously be most likely to be removed but examination of such a sheet under a microscope will show that even after stretching and sucking water through a sheet more than one hundred times, a large proportion of filler spheres remain in the sheeting.

Experiments have shown that sheeting 0.012 inch thick is porous to water if it contains 25 parts or more, by weight, of filler spheres per 100 parts of rubber. With a mix in which there are 15 parts, by weight, or more of filler spheres of less than 50 microns diameter per 100 parts of rubber the sheet is porous to air but in sheets with less than 15 parts (by weight) per 100 parts of rubber, the porosity of the sheet is gradually reduced to 0. It has been found that where the proportion of hollow filler spheres is 35 parts (by weight) per 100 parts of rubber, a sheet with very good porosity to water is obtained.

If larger filler spheres, for example of 60–100 microns diameter, are used the sheeting produced has visibly greater porosity.

The filler spheres are dispersed in water in order to facilitate addition to the latex mix. The spheres have a low specific gravity which causes the spheres to rise to the surface of the dispersion, but they can easily be stirred back in. Similarly, the spheres tend to rise to the surface of the latex mix when the mix is standing but can be easily redispersed. It is necessary periodically to stir the mix while it is being fed to a spreading machine which can be as described in the specification of U.K. Pat. No. 1,326,541.

The invention is also applicable to the production of porous Neoprene sheeting. A suitable dispersion for use in this case is as follows:

| | | |
|---|---|---|
| Neoprene 671 Latex(DuPont U.K. Ltd) | 173.00 | |
| 20% Emulvin W* solution | 6.00 | dissolve Coagulant the Emulvin solution |
| Coagulant WS* | 1.50 | |
| 50% Sulphur dispersion | 2.00 | |
| 50% Zinc diethyl-dithiocarbamate - | 4.00 | |
| 50% Zinc Oxide dispersion | 10.00 | |
| 33% Antioxidant 425 -.- | 6.00 | (2.2'-methylene bis(4 ethyl - 6 tertiary butyl phenol) |
| 35% Fillite "1" dispersion | 100.00 | |
| Ingralite CPV1 Paste | 7.60 | (Ciba-Geigy black pigment dispersion) |

*Trade Marks of Bayer(U.K.) Ltd. Emulvin W is an aromatic polyglycol ether - nonionic emulsifying agent.
1 Fillite is a glass-hard inert silicate in the form of high strength hollow spheres of the order of 50 microns in diameter.

What is claimed is:

1. A method of producing porous articles of elastomeric material comprising incorporating a plurality of hollow spherical filler members formed of hard inert material into a mix of elastomeric material, spreading the elastomeric-filler mixture to form a sheet; drying the sheet to a gel; and subjecting the thus dried and gelled, filled sheet to rigorous multiple stretching, whereby the elastomeric material surrounding the filler particles is elongated so as to break away from the outside of the filler particles, and ultimately ruptured to produce a sheet with permanent porosity, only a portion of the filler particles being removed.

2. A method as claimed in claim 1 wherein the filler members are of glass hard inert silicate material and the mix is of natural or synthetic latex.

3. A method as claimed in claim 1 wherein the filler members are of glass or of a ceramic material.

4. The method of claim 1, wherein the filler particles are spheres of the order of 50 microns or less in size and wherein the elastomer sheet contains at least 15 parts by weight of filler particles per 100 parts of the elastomer.

5. The method of claim 4, wherein the elastomer sheet so formed contains about 15 parts by weight to about 35 parts by weight of filler particles per 100 parts of elastomer.

6. A method of producing porous articles of elastomeric material comprising incorporating a plurality of hollow spherical filler members formed of hard inert material into a mix of elastomeric material; spreading the elastomeric-filler mixture to form a sheet; causing the sheet to gel; and drying the gel; and subjecting the thus gelled and dried, filled sheet to rigorous multiple stretching, comprising placing the thus dried and gelled sheet on a plate having a plurality of holes, and bringing pins to bear on the outer surface of the sheet, stretching the sheet over the pins and pushing the pins and the sheet into the holes, whereby the elastomeric material surrounding the filler particles is elongated so as to break away from the outside of the filler particles, and ultimately ruptured to produce a sheet with permanent porosity, only a portion of the filler particles being removed.

7. A method of producing porous articles of elastomeric material comprising incorporating a plurality of hollow spherical members formed of hard inert material into a mix of elastomeric material; spreading the elastomeric-filler mixture to form a sheet; causing the sheet to gel; drying the gel; and subjecting the thus gelled and dried filled sheet to rigorous multiple stretching, the stretching comprising applying pressure from a fluid selected from the group consisting of liquid and air, to a surface of the sheet, the sheet being over a frame and supported by a mesh structure, whereby the elastomeric material surrounding the filler particles is elongated so as to break away from the outside of the filler particles and ultimately ruptured to produce a sheet with permanent porosity, only a portion of the filler particles being removed.

* * * * *